United States Patent [19]

Nakagaki et al.

[11] Patent Number: 4,647,976
[45] Date of Patent: Mar. 3, 1987

[54] APPARATUS AND METHOD FOR PRODUCING A STILL IMAGE VIDEO SIGNAL USING SOLID-STATE IMAGING DEVICE

[75] Inventors: Shintaro Nakagaki, Fujisawa; Hiroshi Nishiyama, Kanagawa, both of Japan

[73] Assignee: Victor Company of Japan, Ltd., Japan

[21] Appl. No.: 639,347

[22] Filed: Aug. 10, 1984

[30] Foreign Application Priority Data

Aug. 12, 1983 [JP] Japan ................... 58-147441

[51] Int. Cl.$^4$ ........................................ H01N 5/30
[52] U.S. Cl. ................... 358/213; 358/909; 358/335
[58] Field of Search ............ 358/909, 213, 209, 212, 358/335, 336

[56] References Cited

U.S. PATENT DOCUMENTS 4,315,284  2/1982  Stillwell et al. ............ 358/209
4,456,931  6/1984  Toyoda et al. ............. 358/335

FOREIGN PATENT DOCUMENTS 3049130  7/1982  Fed. Rep. of Germany .
1594799  8/1981  United Kingdom .
2105146  3/1983  United Kingdom .

OTHER PUBLICATIONS

"Improving Low-Illumination Video", NASA Technical Briefs, Spring 1979.

Primary Examiner—Robert G. Lev
Attorney, Agent, or Firm—Lowe, Price, LeBlanc, Becker & Shur

[57] ABSTRACT

A solid-state imaging device exposed to incident light ray for a predetermined period of time is driven such that photoelectric conversion signals produced therein are read out twice or more. The photoelectric conversion signals read out in sequence are added to each other such that two or more photoelectric conversion signals from each pixel are added to each other, to produce a resultant sum image signal. The photoelectric conversion signals from the solid-state imaging device may be digitally processed such that A/D converted signal resulted from a first time reading out from the solid-state imaging device is stored in a memory, and this signal is added to a subsequently A/D converted signal resulted from a second time reading out. In the case that the number of times of reading out from the solid-state imaging device is only two, the A/D converted signal resulted from the second time reading may be multiplied by a predetermined coefficient before addition. In the case that a nonlinear quantization characteristic is given to the A/D converter, nonlinear-to-linear conversion is effected before addition.

10 Claims, 7 Drawing Figures

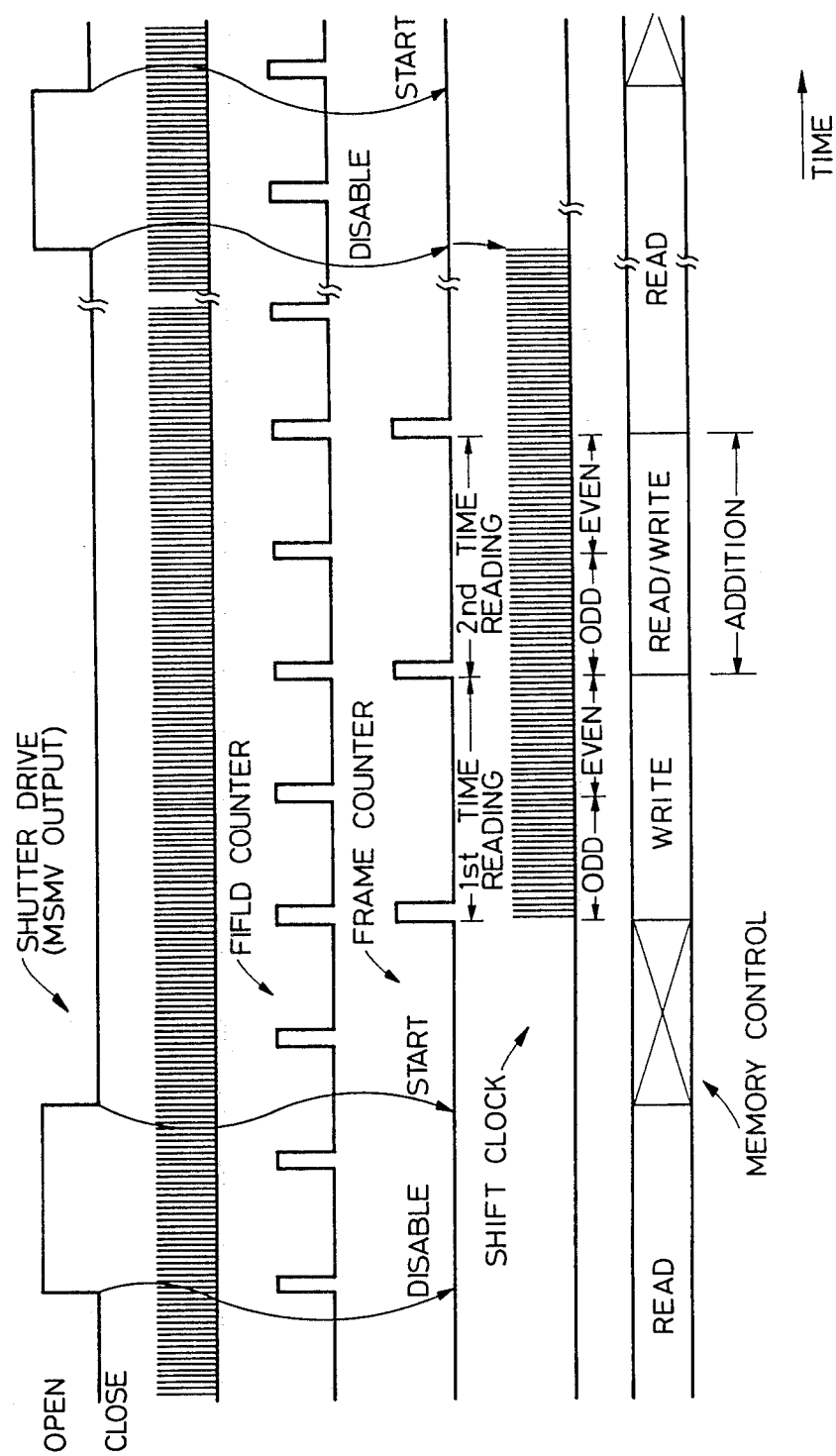

APPARATUS AND METHOD FOR PRODUCING A STILL IMAGE VIDEO SIGNAL USING SOLID-STATE IMAGING DEVICE

BACKGROUND OF THE INVENTION

This invention relates generally to still image pickup apparatus, and particularly to such an apparatus and method for producing a still image video signal using a solid-state imaging device.

Still image pickup apparatus is arranged to store a video signal or a picture signal from an image-pickup device so that the picture signal corresponding to a field or frame is repeatedly read out from a memory. However, when a solid-state imaging device, such as a CCD imaging device, is used as the image pickup device, such still image pickup apparatus has hitherto been unsatisfactory because a high-quality image cannot be obtained for the following reasons.

When a solid-state imaging device is used as an image pickup device, a reproduced still picture is apt to suffer from a fixed pattern of specks due to variations in magnitude of photoelectric conversion signal resulted from scattering of reading out efficiency throughout respective pixels (picture elements) of the solid-state imaging device. Furthermore, in addition to the above reason because of variations in magnitude of photoelectric conversion signal resulted from nonlinear error caused from the scattering of transfer efficiency throughout respective pixels, nonlinear distortion occurs in dark portions in the reproduced picture. Moreover, the dark portion in the reproduced picture shows low luminance, while coloring of the dark portion occurs due to false color signals.

SUMMARY OF THE INVENTION

The present invention has been developed in order to remove the above-described drawbacks inherent to the conventional still image pickup apparatus using one or more solid-state imaging device.

It is, therefore, an object of the present invention to provide a new and useful still image pickup apparatus using one or more solid-state imaging device so that a satisfactory reproduced still picture of high quality is obtained.

According to a feature of the present invention a solid-state imaging device responsive to incident light carrying optical information of an object to be taken, is used such that an image signal including photoelectric conversion signals from the solid-state imaging device is read out twice or or more, and video image signals read out twice or more are processed by using a memory so that a resultant sum image signal is produced with the image signals being added to each other.

In accordance with the present invention there is provided a still image pickup apparatus comprising: first means for passing a light ray from an object for a predetermined period of time; a solid-state image pickup device responsive to said light ray from said first means for producing photoelectric conversion signals in respective pixels thereof; second means for reading out said photoelectric conversion signals as an image signal from said solid-state image pickup device at least twice or more; third means for storing a first image signal resulted from a first time reading out; and fourth means for adding said first image signal read out from said third means to a second image signal from said solid-state imaging device so that two image signals respectively resulted from first and second readings are added to each other for producing a resultant sum image signal.

In accordance with the present invention there is also provided a still image pickup apparatus comprising: first means for passing a light ray from an object for a predetermined period of time; a solid-state image pickup device responsive to said light ray from said first means for producing photoelectric conversion signals in respective pixels thereof; second means for reading out said photoelectric conversion signals as an image signal from said solid-state image pickup device at least twice or more; an A/D converter responsive to said image signal from said solid-state image pickup device; a memory responsive to a digital signal from said A/D converter for storing a first image signal resulted from a first time reading out; a digital adder responsive to said first image signal read out from said memory and to a second image signal resulted from a second time reading out for producing a resultant sum image signal by adding said image first and second signals to each other; a memory control circuit for controlling reading and writing operations of said memory, said resultant sum image signal being written into said memory via said memory control circuit and is read out cyclically; and a D/A converter responsive to said resultant sum image signal read out from said memory for converting the same into an analog video signal.

In accordance with the present invention there is further provided a method of producing a still image video signal using at least one solid-state imaging device, comprising the steps of: applying a light ray from an object to said solid-state imaging device for a predetermined period of time; performing a first time reading so that a first image signal including photoelectric conversion signals generated in said solid-state imaging device is read out; converting the read out first image signal into a first digital signal; storing said first digital signal into a memory; performing a second time reading so that a second image signal including photoelectric conversion signals generated in said solid-state imaging device is read out; converting said second image signal into a second digital signal; reading out said first digital signal from said memory; adding said second digital signal to said first digital signal for obtaining a resultant sum image signal; storing said resultant sum image signal into said memory so that said first digital signal is renewed by said resultant sum image signal; reading out said resultant sum image signal from said memory cyclically; and converting said resultant sum image signal into an analog image signal.

BRIEF DESCRIPTION OF THE DRAWINGS

The object and features of the present invention will become more readily apparent from the following detailed description of the preferred embodiments taken in conjunction with the accompanying drawings in which:

FIG. 3 is a timing chart useful for understanding the operation of the present invention;

The same or corresponding elements and parts are designated at like reference numerals throughout the drawings.

DETAILED DESCRIPTION OF THE INVENTION

Figure 1:
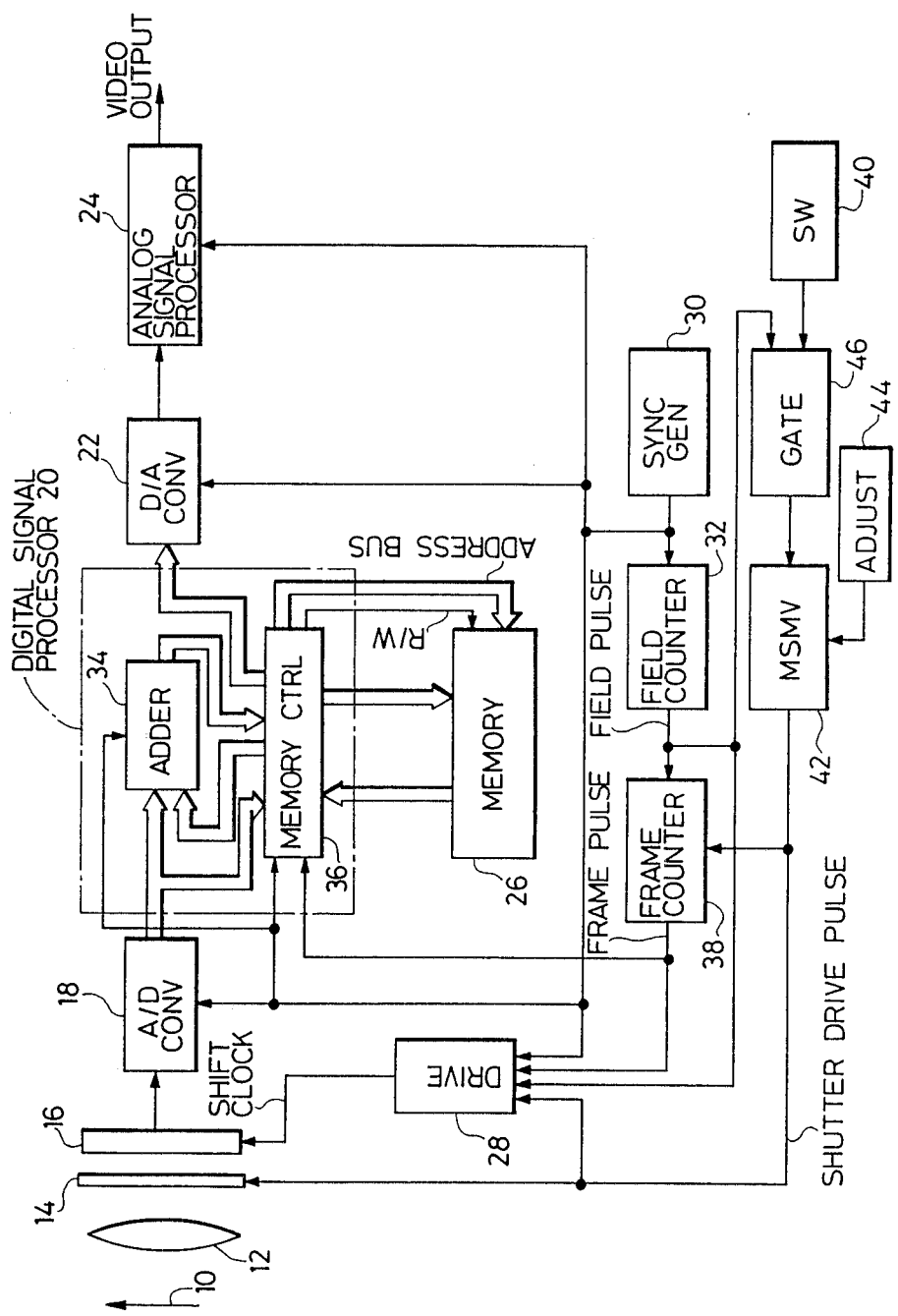
FIG. 1 is a schematic block diagram of an embodiment of the solid-state imaging apparatus according to the present invention.

Referring now to FIG. 1, a schematic block diagram of an embodiment of the still image pickup apparatus according to the present invention is shown. The embodiment comprises an optical system 12 for collecting and focussing a light ray from an object 10 to be taken. The optical system 12 is represented by a symbol of a convex lens. The light ray passed through the optical system 12 is applied via a shutter 14 to a solid-state imaging device 16, such as a CCD imaging device. The shutter 14 is responsive to a drive signal from a monostable multivibrator 42 so as to open for a predetermined period of time to apply the light ray from the optical system 12 to the solid-state imaging device 16 for the predetermined period of time. The monostable multivibrator 42 is responsive to a trigger pulse fed from a manually operable switch 40 so as to produce a pulse signal having the predetermined period of time. The width of the pulse from the monostable multivibrator 42 may be controlled by way of an adjusting circuit 44 which changes a time constant of the monostable multivibrator 42 thereby selecting a desired shutter speed. The solid-state imaging device 16 is reponsive to shift clock pulses from a drive circuit 28 which selectively passes sync pulses from a sync pulse generator 30.

The embodiment of FIG. 1 also comprises an analog-to-digital (A/D) converter 18, a digital signal processor 20, a digital-to-analog (D/A) converter 22, an analog signal processor 24, a semiconductor memory 26, and first and second counters 32 and 38. The first counter 32 is responsive to the pulses from the sync pulse generator 30, while the second counter 38 is responsive to pulses from the first counter 32. More specifically, the first counter 32 produces vertical sync pulses each time the number of pulses from the sync pulse generator 30 reaches a predetermined number equal to the number of pixels of the solid-state imaging device 16. With this arrangement, the vertical sync pulse, therefore, represents each field. Thus, the first counter 32 is referred to as a field counter, and the vertical sync pulse is referred to as a field pulse. The field pulse is fed to a gate circuit 46 responsive to a trigger signal from the switch 40 so that the shutter 14 opens in response to a field pulse after the switch 40 is manipulated. The second counter 38 counts the number of the vertical sync pulses from the first counter 32 to produce an output pulse when the number of the vertical sync pulses reaches a predetermined value which is two or more. This number is determined depending on the number of times of reading out from the solid-state imaging device 16 as will be described in detail hereinlater. The second counter 38 which counts the number of field pulses from the field counter 32 is referred to as a frame counter.

The digital signal processor 20 comprises a digital adder 34 and a memory control circuit 36 which controls the memory 26 used for storing a digital video signal from the A/D converter 18 and also another digital video signal from the adder 34 arranged to add a digital video signal from the A/D converter 18 to another digital video signal read out from the memory 26.

The analog signal processor 24 per se is of a conventional circuit which processes an analog video signal for producing output video signal of a desired format, such as NTSC.

The embodiment of FIG. 1 operates as follows. Assuming that the shutter 14 is driven to open the same for a predeterming period of time, the light ray from the object 10 is incident on the surface of the solid-state imaging device 16 for the predetermined period of time. As a result, the solid-state imaging device 16 produces a charge or photoelectric conversion signal at each pixel thereof. When the output pulse from the monostable multivibrator 42 turns low to close the shutter 14, the drive circuit 28 is enabled to pass the sync pulses from the sync pulse generator 30 in response to the field and/or frame pulse. As a result, shift clock pulses are fed to the solid-state imaging device 16 to shift charges or photoelectric conversion signals within the solid-state imaging device 16 so that the photoelectric conversion signal is outputted from an output terminal of the solid-state imaging device 16 and is applied to an input terminal of the A/D converter 18 which cyclically converts the analog photoelectric conversion signal into a digital signal at a predetermined sampling interval defined by a sampling pulse signal. As this sampling pulse signal is used the output pulse signal from the sync pulse generator 30 so that the photoelectric conversion signal is converted into a digital signal or word such that one digital data is obtained for each pixel of the solid-state imaging device 16. The digital word obtained at an output port of the A/D converter 18 is fed to the digital signal processor 20. More specifically, the digital words indicative of video information from respective pixels are fed via the memory control circuit 36 to the memory 26 to be stored therein. To this end the memory control circuit 36 is responsive to the pulses from the sync pulse generator 30 and to an output pulse from the frame counter 38. In this way video information of all the pixels of the solid-state imaging device 16 is stored in sequence in the memory 26 at different addresses which are disignated by address-disignating signal fed from the memory control circuit 36 via an address bus. The memory control circuit 36 also produces a read/write control signal which is fed to the memory 26 for effecting read/write control of the memory 26, in response to the frame pulse.

The photoelectric conversion signals generated in the pixels of the solid-state imaging device 16, which result from the application of an optical image of the object 10 for a predetermined period of time, are repeatedly read out for a plurality of times after the shutter 14 is closed. A set of photoelectric conversion signals obtained from all the pixels is referred to as an image signal, and is processed such that a resultant sum image signal is obtained by the digital signal processor 20 by adding a latest image signal to a former image signal or a previously produced sum image signal stored in the memory 26.

Since the resultant sum image signal is obtained by adding two or more image signals of an identical object 10 such that image singals for the same pixel are added to each other, the above-mentioned problems inherent to the conventional apparatus are effectively removed. This point will be further described. Since the solid-state imaging device 16 is exposed to incident light for a predetermined period of time in a still image pickup apparatus, the magnitude of the photoelectric conversion signal or charge generated and stored in each pixel in correspondence with optical information of the object 10 decreases each time the photoelectric conversion signal is read out.

Figure 2:
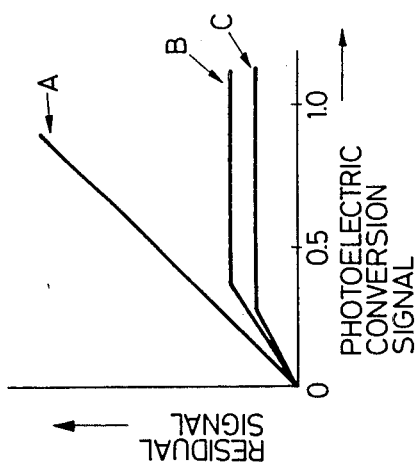
FIG. 2 is an explanatory graph useful for understanding the operation of the present invention.

FIG. 2 shows the ralationship between the magnitude of the photoelectric conversion signal generated within the solid-state imaging device 16 and the magnitude of residual signal which remains in the solid-state imaging device 16 after signal read out. A curve "A" indicates such a relationship under a condition where the photoelectric conversion signal is not yet read out. A curve "B" indicates such a relationship under a condition where the photoelectric conversion signal has been read out once, and another curve "C" indicates such a relationship under a condition where the photoelectric conversion signal has been read out twice.

As is apparent from the graph of FIG. 2, the reading out efficiency of photoelectric conversion signal varies in accordance with the magnitude of the initially generated photoelectric conversion signal within the solid-state imaging device 16. Furthermore, the reading out efficiency of photoelectric conversion signal varies throughout the pixels due to variations in semiconductor characteristics. Therefore, when the photoelectric conversion signal is read out from each pixel only once as in the conventional apparatus, the derived photoelectric conversion signal causes various problems described at the beginning of the specification.

According to the present invention, therefore, reading out from the solid-state imaging device 16 is effected twice or more so that a plurality of photoelectric conversion signals read out from the same pixel are added to each other to obtain a resultant sum image signal. As a result, the resultant sum image signal carries information accurately corresponding to optical information of the object 10.

Turning back to FIG. 1, the operation of the still image pickup apparatus according to the present invention will be described in detail with reference to a timing chart of FIG. 3. When the switch 40 is manually operated by a user, a trigger pulse is generated in response to a subsequent field pulse to cause the monostable multivibrator 42 to produce a shutter drive pulse having a predetermined width which is adjustable by the adjusting circuit 44. The shutter 14 is arranged to open in response to a leading edge of the shutter drive pulse and to close in response to a trailing edge thereof. As the shutter 14 opens, the light ray from the object 10 is incident on the solid-state imaging device 16 to generate charges at respect pixels thereof in accordance with an image of the object 10. At this time, no shift clock pulse is applied from the drive circuit 28 to the solid-state imaging device 16, and therefore, no photoelectric conversion signal is outputted therefrom. When the shutter 14 is closed, then the frame counter 38 starts counting the number of field pulses. Let us assume that the frame counter 38 is arranged to output a frame pulse when two field pulses are counted. In respose to a second field pulse detected after count-starting, the frame counter 38 produces a frame pulse which causes the drive circuit 28 to start sending shift clock pulses to the solid-state imaging device 16. The solid-state imaging device 16 is driven by the shift clock pulses so that photoelectric conversion signals respectively corresponding to pixels thereof are outputted in sequence. A set of photoelectric conversion signals corresponding to all the pixels forming an odd field and an even field is referred to as an image signal. This image signal resulted from first time reading out is A/D converted by the A/D converter 18 such that each photoelectric conversion signal of each pixel is converted into a digital word. In this way a number of digital words representing the image signal of the first time reading out are obtained in sequence and subsequently stored into the memory 26 via the memory control circuit 36. Since the reading out is effected with interlace for obtaining odd and even field output signals for each frame, the drive circuit 28 is responsive to the field pulses and frame pulses from the field counter 32 and the frame counter 38. After the completion of the first time reading out, the solid-state imaging device 16 is further driven so as to effect a second time reading out for producing a second image signal when the shutter 14 is still kept closed. This second image signal is converted into a number of digital words in the same manner as the first-mentioned image signal. The digital words corresponding to the second image signal are not stored in the memory 26 but are fed to the adder 34 to be added to the first-mentioned digital words which are read out from the memory 26. This addition is performed such that each digital word resulted from the second time reading out is added to each digital word resulted from the first time reading out so that two photoelectric conversion signals respectively derived from an identical pixel are added to each other. As a result of addition, a resultant sum image signal in the form of a number of digital words is obtained at the output port of the adder 34. This resultant sum image signal is stored in the memory 26 via the memory control circuit 36 by rewriting the first set of digital words. In other words, the first set of digital words representing the photoelectric conversion signals resulted from the first time reading out are renewed or updated with the set of digital words corresponding to the second time reading out to form a resultant sum image signal.

As shown at the bottom of FIG. 3, the memory control circuit 36 produces a WRITE signal in response to a first frame pulse so that the memory 26 is put in WRITE mode until a second frame pulse is applied. Therefore, the image signal resulted from the first time reading out is stored into the memory 26. In response to a second frame pulse the memory control circuit 36 produces a WRITE & READ signal so that the memory 26 is put in WRITE & READ mode until a third frame pulse is applied thereby each digital word stored in the memory 26 is read out to be added to a digital word of the second image signal for producing a resultant sum image digital word which is stored in the memory 26 in turn. It is to be noted that both the solid-state imaging device 16 and the memory control circuit 36 are controlled by the frame pulse from the frame counter 38 so as to establish synchronization for adding the second image signal from the A/D converter 18 to the first image signal read out from the memory 26 such that two digital words representing photoelectric conversion signals from an indentical pixel are added to each other. In this way all the digital words stored in the memory 26 are renewed or updated. When the third frame pulse is applied, then the memory control circuit 36 produce a READ signal which causes the memory 26 to assume a READ mode. Therefore, the digital words stored in the memory 26 are reapeatedly read out to be fed to the D/A converter 22.

The above description has been made under an assumption that the apparatus of FIG. 1 is arranged to effect reading out from the solid-state imaging device 16 only twice. However, the number of times of reading out from the solid-state imaging device 16 may be more than two. In the case that the apparatus of FIG. 1 is designed to effect reading out from the soid-state imaging device three or more times, the digital signal processor 20 operates as follows. Reading out from the solid-state imaging device 16 of the first and second times is effected in the same manner as described in the above. When the solid-state imaging device 16 is driven to effect a third time reading out for obtaining a third set of digital words at the output port of the A/D converter 18, then the third set of digital words are added to the digital words corresponding to the resultant sum image signal which is previously stored and read out from the memory 26. In this way, as the solid-state imaging device 16 is driven to effect reading out a plurality of times, the contents of the memory 26 are renewed in sequence. Accordingly, when a last time reading out is performed, a resultant sum image signal obtained at the output terminal of the adder 34 represents the sum of photoelectric conversion signals resulted from the last time reading out and photoelectric conversion signals updated within the memory 26. Since the updating is performed by adding the newest photoelectric conversion signals to the sum of previously read out photoelectric conversion signals for respective pixels, the finally obtained resultant sum signal at the end of the last reading out represents the total sum of photoelectric conversion signals obtained through a plurality of readings. This finally obtained resultant sum signal is also stored in the memory 26, and is then read out repeatedly in the same manner as described in the above.

The number of times of reading out may be any number which is more than one. Although the number of times of reading out is desired to be a large number so as to obtain more accurate output information, the number of times of reading out may be set to two by omitting third and the following reading out if necessary correction is performed. More specifically, since the tendency of the variation in the magnitude of residual photoelectric conversion signals ramain in the solid-state imaging device 16 after the second time reading out is substantially the same irrespective of the number of times of reading out, third and subsequent reading out operations can be omitted with the photoelectric conversion signal resulted from the second time reading out being multiplied by a coefficient of 1 to 1.5 before addition.

Figure 4:
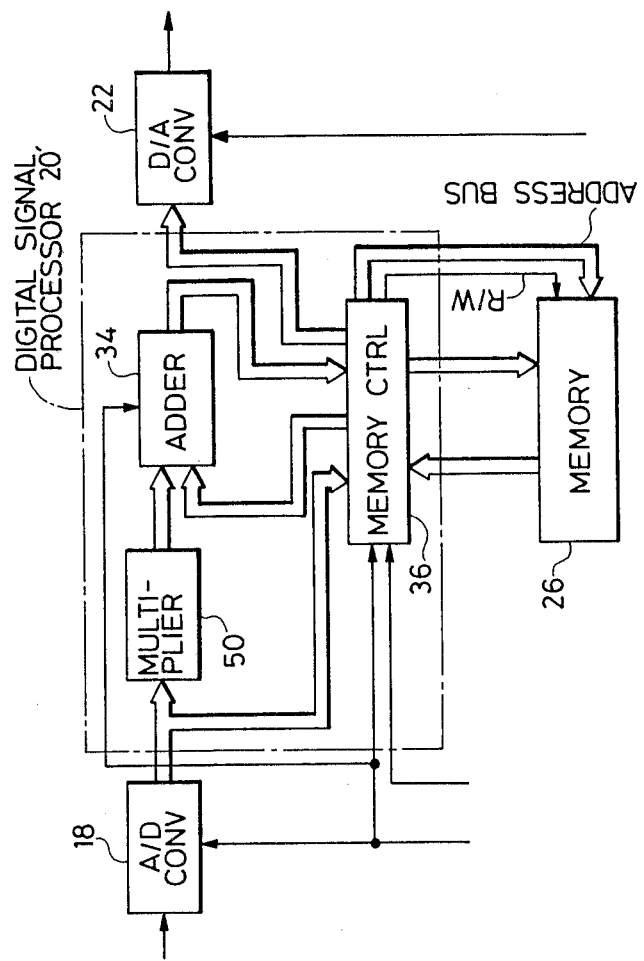
FIG. 4 is a partial schematic block diagram of another embodiment of the present invention.

Hence, reference is now made to FIG. 4 showing another embodiment in which reading out from the solid-state imaging device 16 is effected only twice. The embodiment of FIG. 4 differs from the embodiment of FIG. 1 in that a multiplier 50 is interposed between the output port of the A/D converter 18 and an input port of the adder 34. The multiplier 50 is arranged to multiply each digital word by a predetermined coefficient, such as 1 to 1.5. The output port of the A/D converter 18 is directly connected to the memory control 36 in the same manner as in the first-described embodiment so that the first set of digital words resulted from first time reading out are stored in the memory 26 without multiplication. Therefore, multiplication is performed in connection with the second set of digital words resulted from the second time reading out.

While the analog image signal from the solid-state imaging device 16 is A/D converted by way of the A/D converter 18, the level of quantization noise generated in the A/D converter 18 is constant. In order to reduce quantization noise, although it is theoretically possible to use a sufficiently small quantization step, such an approach results in increase in bit numbers of obtained digital data, and therefore a large storage capacity is required for the memory 26. As is well known in the art, since a large amplitude input analog signal suffers from less quantization noise, a non-linear quantization characteristic may be used for the A/D converter 18 so as to effectively reduce quantization noise. This technique of using non-linear quantization characteristic is especially useful because the amplitude of photoelectric conversion signal derived from the solid-state imaging device 16 becomes smaller and smaller as reading out is effected a plurality of times.

Figure 6:
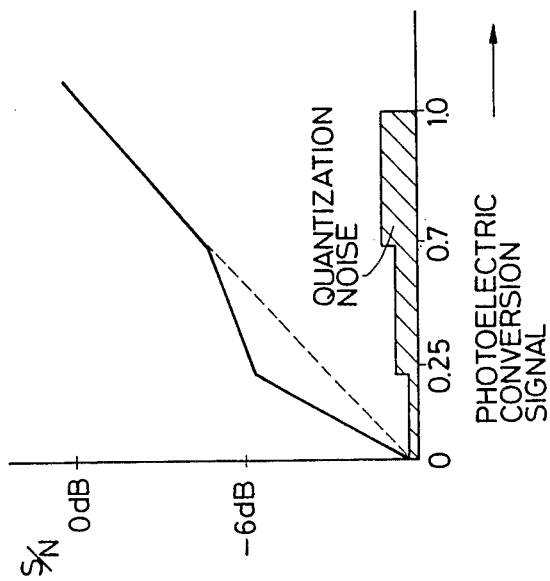
FIGS. 5 and 6 are graphs useful for understanding the operation of another embodiment of the present invention.
Figure 5:
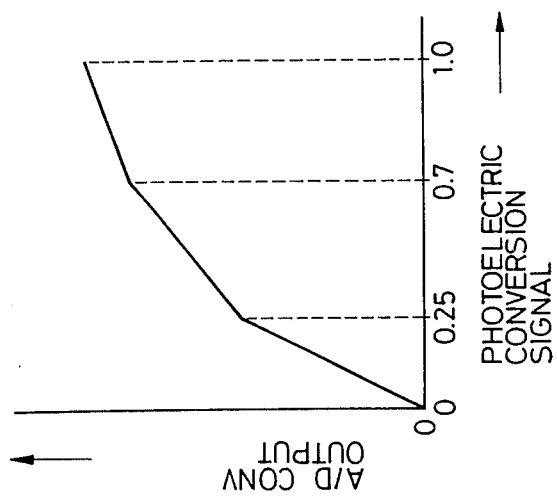

FIG. 5 is a graph showing the relationship between input and output of the A/D converter 18 having such non-linear quantization characteristic. FIG. 6 is a graph showing signal-to-noise (S/N) ratio of such A/D converter 18 with respect to magnitude of the photoelectric conversion signal. As will be understood from FIG. 6, when nonlinear quantization characteristic is used, S/N is improved as shown by a solid curve compared to S/N resulted in the case of using a linear quantization characteristic (see dotted curve).

In the case that the A/D converter 18 of FIG. 1 has a nonlinear quantization characteristic as shown in FIG. 5, the D/A converter 22 has to have an input-output level characteristic which is reverse to the nonlinear quantization characteristic of the A/D converter 18. Furthermore, the digital signal processor 20 has to be arranged so that addition is performed without suffering from possible errors due to such nonlinear quantization characteristic.

Figure 7:
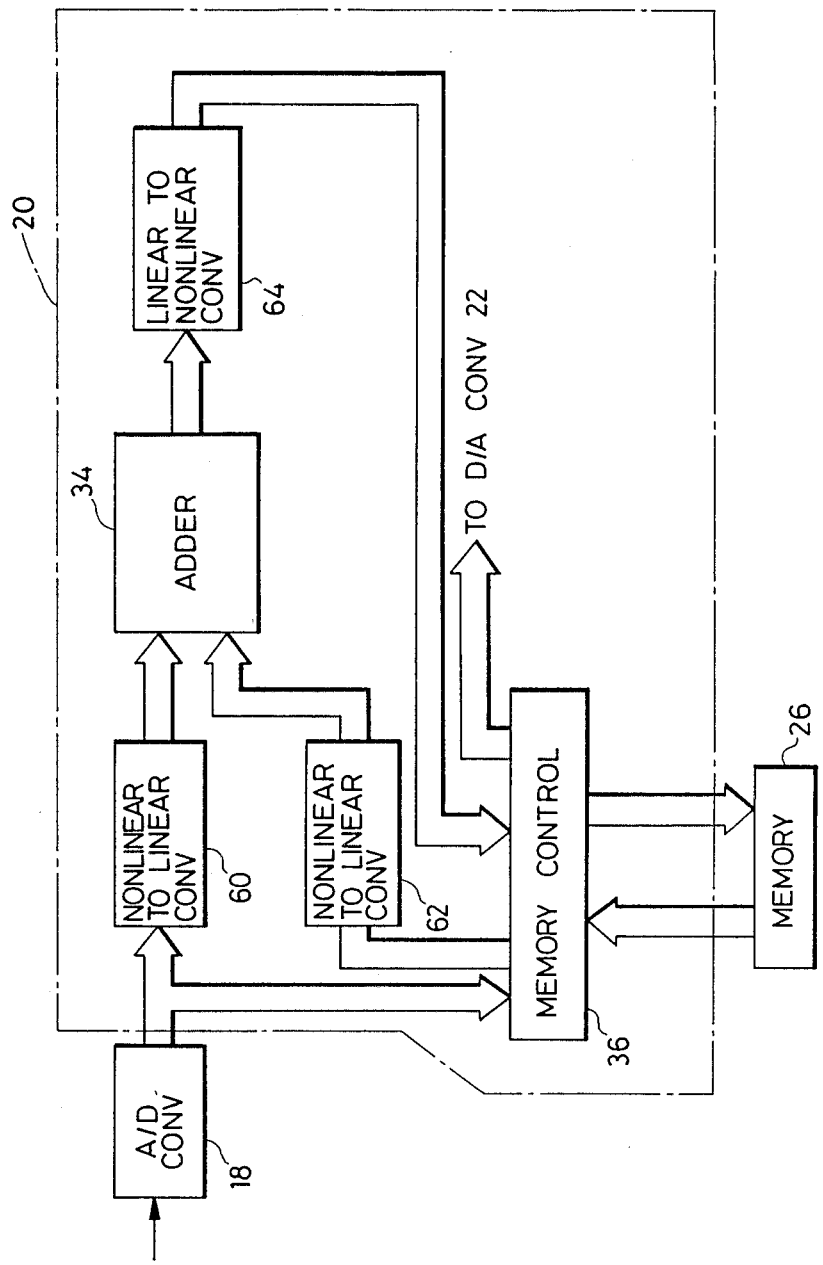
FIG. 7 is a partial schematic block diagram of another embodiment of the solid-state imaging apparatus according to the present invention.

FIG. 7 shows an example of the digital signal processor 20 which may be used for the A/D converter 18 having such a nonlinear quantization characteristic. The output digital signal is fed to the memory control circuit 36 in the same manner as in FIG. 1, but is fed via a first nonlinear-to-linear converter 60 to the adder 34. A second nonlinear-to-linear converter 62 is provided between the memory control circuit 36 and another input port of the adder 34 so that digital data read out from the memory 26 is converted into linear characteristic data before it is applied to the adder 34. As a result, addition by way of the adder 34 is performed with both digital data to be added to each other being converted into linear characteristic data. After addition, a resultant sum signal is fed via linear-to-nonlinear converter 64 to the memory control circuit 64. From the above, it will be understood that digital data stored in the memory 26 via the memory control circuit 36 has nonlinear characteristic, while nonlinear signals are added to each other after converted into linear signals.

In the above, although it has been described that the A/D converter 18 has a nonlinear quantization characteristic so as to reduce quantization noise, the same results will be obtained with an A/D converter having linear quantization characteristic if the image signal from the solid-state imaging device 16 is fed to such an A/D converter via a variable-gain amplifier capable of giving a nonlinear input-output characeteristic. In this case also, the D/A converter 22 has to have an input-output characteristic which is reverse to the nonlinear characteristic of the amplifier. However, if a variable gain amplifier, which gives such reverse characterictic, to an output signal from the D/A converter 22 is employed, a linear characteristic D/A converter may be used.

As described in the above, since the magnitude of the image signal from the solid-state imaging device 16 lowers as reading out is repeatedly effected, S/N ratio lowers due to quantization noise occurring on A/D conversion as the number of times of reading out increases. To solve this problem a variable-gain amplifier may be used to increase the magnitude of the photoelectric conversion signals resulted from successive readings with successively increasing amplitudes so that each of the photoelectric conversion signals to be A/D converted has a relatively large amplitude thereby avoiding the deterioration in S/N ratio. When such an amplifier is used, it is necessary to lower the amplitude defined by each digital word by respective values equal to increased levels prior to addition.

Although in the above-described embodiments, the output signal from the solid-state imaging device 16 is directly fed to the A/D converter 18 to be A/D converted, the signal to be fed to the A/D converter 18 may be an analog video signal which is produced by processing one or more output signals from solid-state imaging devices as in a television camera of either monochrome or color type.

The above-described embodiments are just examples of the present invention, and therefore, it will be apparent for those skilled in the art that many modifications and variations may be made without departing from the spirit of the present invention.

What is claimed is:

1. A still image pickup apparatus comprising:
   (a) shutter means for passing a light ray from an object for only a predetermined period of time;
   (b) a solid-state image pickup device responsive to said light ray from said shutter means for producing photoelectric conversion signals in respective pixels thereof;
   (c) first means for reading out said photoelectric conversion signals at least twice for each exposure by said shutter means as an image signal from said solid-state image pickup device;
   (d) second means for controlling said shutter means and said first means so that a reading out operation of said first means is effected when said shutter means is in a closed state;
   (e) memory means for storing a first image signal resulting from a first reading out from said image pickup device;
   (f) multiplying means for amplifying a second image signal resulting from a second reading out from said image pickup device so that the magnitude of said second image signal is multiplied by a variable coefficient; and
   (g) third means for adding an output signal from said multiplying means to said first signal from said solid-state imaging device so that two image signals respectively resulting from first and second readings are added to each other for producing a resultant sum image signal.

2. A still image pickup apparatus as claimed in claim 1, further comprising an A/D converter responsive to said image signals from said solid-state imaging device, and a D/A converter responsive to data read out from said memory means.

3. A still image pickup apparatus as claimed in claim 2, wherein said A/D converter has a given nonlinear quantization characteristic, and said D/A converter has a given input-output charactericteristic which is reverse to said given nonlinear quantization characteristic.

4. A still image pickup apparatus as claimed in claim 3, further comprising a first nonlinear-to-linear converter responsive to said second image signal from said A/D converter for supplying said third means with a linear characteristic signal, a second nonlinear-to-linear converter responsive to said first image signal read out from said memory means for supplying said third means with a linear characerstic signal, and a linear-to-nonlinear converter responsive to an output signal from said third means for supplying said memory means with a nonlinear characteristic signal.

5. A still image pickup apparatus comprising:
   (a) shutter means for passing a light ray from an object for only a predetermined period of time;
   (b) a solid-state image pickup device responsive to said light ray from said shutter means for producing photoelectric conversion signals in respective pixels thereof;
   (c) first means for reading out said photoelectric conversion signals at least twice for each exposure by said shutter means as an image signal from said solid-state image pickup device;
   (d) second means for controlling said shutter means and said first means so that a reading out operation of said first means is effected when said shutter means is in a closed state;
   (e) an A/D converter responsive to said image signal from said solid-state image pickup device;
   (f) a memory responsive to a digital signal from said A/D converter for storing a first image signal resulting from a first reading out from said image pickup device;
   (g) a digital multiplying means for multiplying a second image signal resulting from a second reading out from said image pickup device so that the magnitude of said second image signal is multiplied by a variable coefficient;
   (h) a digital adder responsive to said first image signal read out from said memory and to said multiplied second image signal resulting from said second reading out for producing a resultant sum image signal by adding said first and said multiplied second image signals to each other;
   (i) a memory control circuit for controlling reading and writing operations of said memory means, said resultant sum image signal being written into said memory means via said memory control circuit and being read out cyclically; and
   (j) a D/A converter responsive to said resultant sum image signal read out from said memory means for converting the same into an analog video signal.

6. A method of producing a still image video signal using at least one solid-state imaging device, comprising the steps of:
   (a) applying a light ray from an object to said solid-state imaging device for a predetermined period of time;
   (b) performing a first time reading when said light ray is not being applied to said solid-state imaging device so that a first image signal including photoelectric conversion signals generated in said solid-state imaging device is read out;
   (c) converting the read out first image signal into a first digital signal;
   (d) storing said first digital signal into a memory;

(e) performing a second time reading when said light ray is not being applied to said solid-state imaging device so that a second image signal including photoelectric conversion signals generated in said solid-state imaging device is read out for a single light exposure for said predetermined period of time;

(f) converting said second image signal into a second digital signal;

(g) multiplying said second digital signal by a variable coefficient to obtain a multiplied second digital signal;

(h) reading out said first digital signal from said memory;

(i) adding said second digital signal to said first digital signal for obtaining a resultant sum image signal;

(j) storing said resultant sum image signal into said memory so that said first digital signal is renewed by said resultant sum image signal;

(k) reading out said resultant sum image signal from said memory cyclically; and (l) converting said resultant sum image signal into an analog image signal.

7. A still image pickup apparatus comprising:

(a) a first means for passing a light ray from an object for a predetermined period of time;

(b) a solid-state image pickup device responsive to said light ray from said first means for producing photoelectric conversion signals in respective pixels thereof to represent a still image of the object;

(c) second means for reading out said photoelectric conversion signals representing said still image at least twice for a single light exposure for said predetermined period of time to provide at least two image signals from said solid-state image pickup device;

(d) third means for storing a first image signal resulted from a first reading out; and (e) fourth means for adding said first image signal read out from said third means to a second image signal from said solid-state imaging device so that two image signals respectively resulting from first and second readings are added to each other for producing a resultant sum image signal.

8. A still image pickup apparatus as recited in claim 7 wherein said second means is operable for reading out said photoelectric conversion signals as residual signals of said solid-state image pickup device.

9. A still image pickup apparatus as recited in claim 8 further comprising amplifying means for amplifying said second image signal from said solid-state imaging device by a factor greater than 1.

10. A still image pickup apparatus as recited in claim 9 further comprising means for selecting the amplifying factor to correspond to a magnitude of the residual signal remaining after the first read out from said image pickup device, thereby overcoming deterioration in magnitude of residual signals in the pickup device.

* * * * *